(12) United States Patent
Houle et al.

(10) Patent No.: US 11,458,823 B2
(45) Date of Patent: Oct. 4, 2022

(54) COVER FOR A VEHICLE

(71) Applicant: BOMBARDIER RECREATIONAL PRODUCTS INC., Valcourt (CA)

(72) Inventors: Benjamin Houle, Drummondville (CA); Caroline Letendre, Drummondville (CA); Benoit Morissette, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 172 days.

(21) Appl. No.: 16/913,080

(22) Filed: Jun. 26, 2020

(65) Prior Publication Data

US 2020/0406732 A1 Dec. 31, 2020

Related U.S. Application Data

(60) Provisional application No. 62/866,833, filed on Jun. 26, 2019.

(51) Int. Cl.
*B60J 11/06* (2006.01)
*F16B 2/24* (2006.01)

(52) U.S. Cl.
CPC ............... *B60J 11/06* (2013.01); *F16B 2/245* (2013.01)

(58) Field of Classification Search
CPC ... B62J 19/00; B60J 11/04; B60J 11/06; B60J 11/025; B60J 11/00; F16B 2/245; F16B 2/22; F16B 21/071; F16B 21/073; F16B 5/126; F16B 5/121

USPC ................ 296/136.07, 136.08; 150/167
See application file for complete search history.

(56) References Cited

U.S. PATENT DOCUMENTS

| | | | |
|---|---|---|---|
| 8,764,097 B2 | 7/2014 | Fournier et al. | |
| 9,180,763 B2 | 11/2015 | Fournier et al. | |
| 2014/0311637 A1* | 10/2014 | Fournier | B60J 11/06 150/166 |
| 2016/0121705 A1* | 5/2016 | Taylor-Hughes | E04H 15/64 150/166 |
| 2019/0104865 A1* | 4/2019 | McKeel | G09F 3/16 |
| 2020/0114746 A1* | 4/2020 | Mazzarelli | B60J 11/00 |

* cited by examiner

*Primary Examiner* — Joseph D. Pape
*Assistant Examiner* — Veronica M Shull
(74) *Attorney, Agent, or Firm* — BCF LLP

(57) ABSTRACT

A cover for covering at least partially a vehicle. The vehicle includes a straddle seat and a footrest extending along a lateral side of the vehicle. The cover includes a cover body and a clip connected to the cover body. The clip is configured to be connected to the footrest of the vehicle. The clip includes: a clip body fastened to the cover body; an upper connector extending from an inner side of the clip body and configured to engage an upper side of the footrest so as to restrict forward movement of the clip relative to the footrest; and a lower connector extending from an inner side of the clip body and configured to engage a lower side of the footrest. The clip is configured such that, when the clip is connected to the footrest, an edge portion of the footrest is located between the upper and lower connectors.

20 Claims, 14 Drawing Sheets

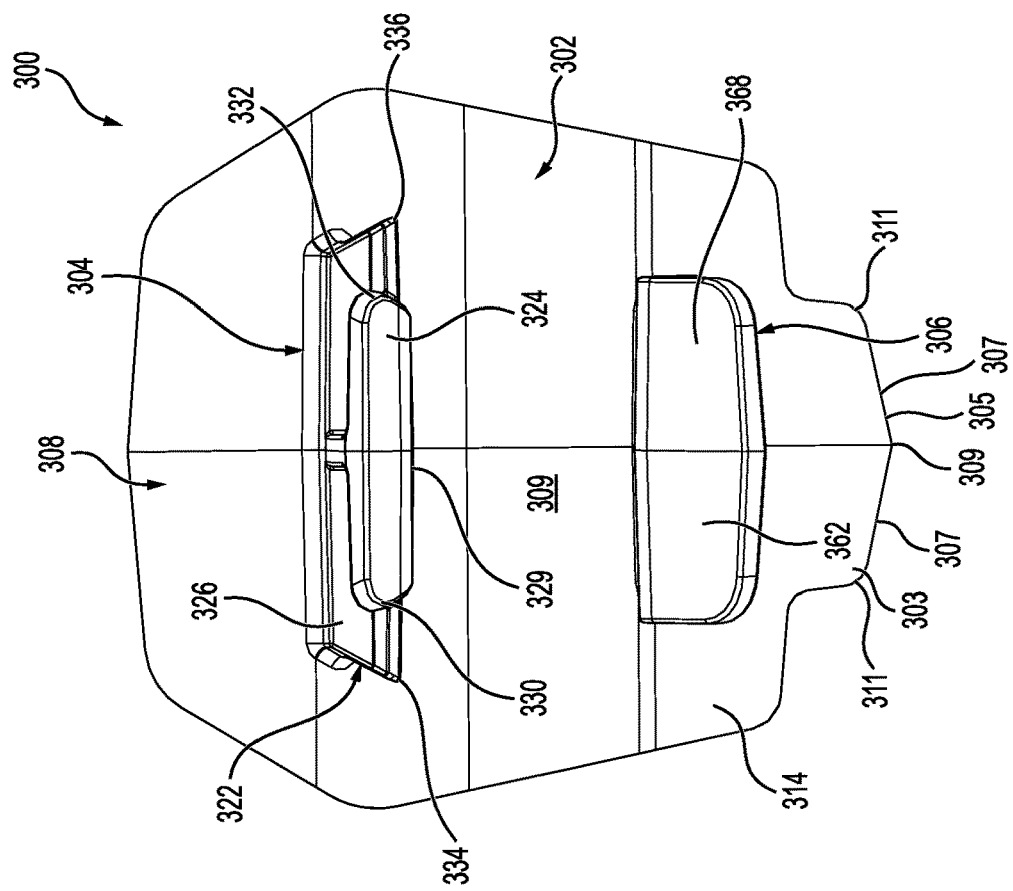
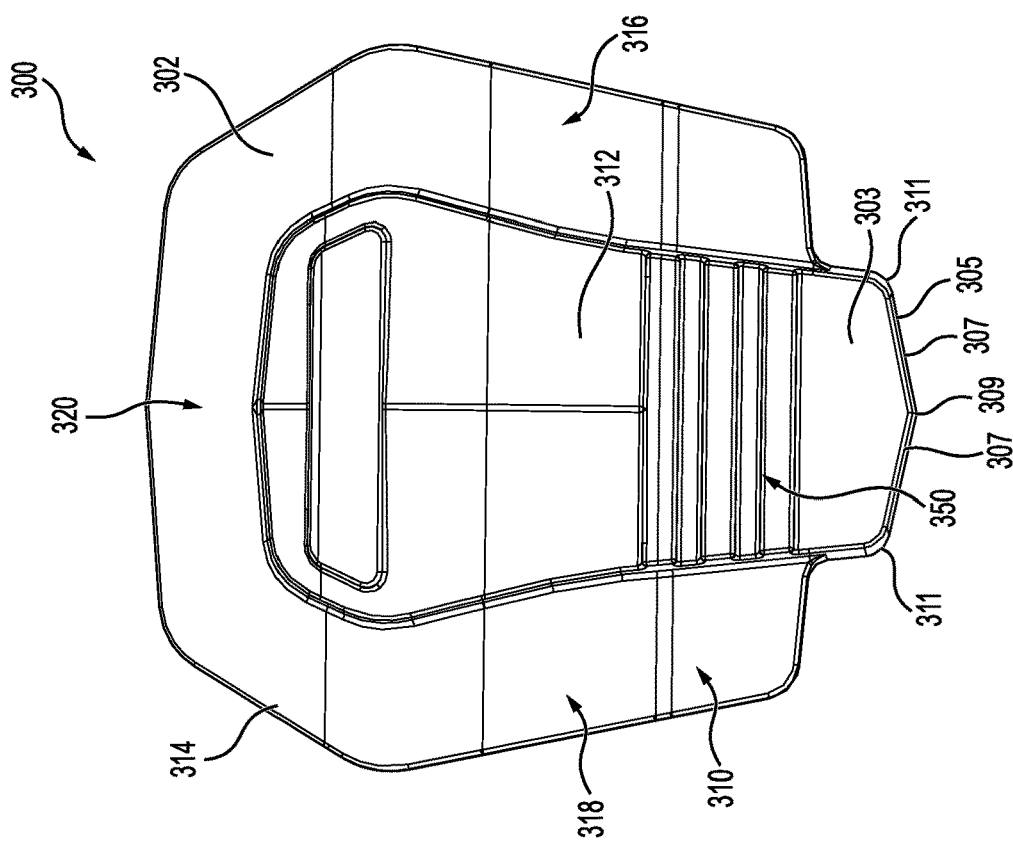

COVER FOR A VEHICLE

CROSS-REFERENCE

The present application claims priority from U.S. Provisional Patent Application No. 62/866,833, filed on Jun. 26, 2019, the entirety of which is incorporated herein by reference.

TECHNICAL FIELD

The present relates to protective covers for vehicles and to methods for using such covers.

BACKGROUND

Certain vehicles, for example recreational vehicles, are normally covered with protective covers during storage or when they are being towed by another vehicle. The covers provide protection against the elements of nature, such as the sun, snow and dirt.

Conventionally, covers are designed to snugly fit over the particular vehicle to be covered. Soft, lightweight covers are often used as they can easily be folded up and stored away when not in use. Such conventional covers generally comprise a large upper portion made of nylon or similarly weatherproof material which is sized and fitted to slide over the top of the entire upper body portion of the vehicle. In the example of a snowmobile, the cover generally covers the forward fairings of the external shell and the seat portion. Typically, the wheels or skis and track of the vehicle are left uncovered by this type of cover, however the cover may alternatively cover one or more of these.

While such covers typically fulfill their function adequately when the vehicle is static, they face greater difficulty when the vehicle is being transported while covered. Notably, vehicles covered with these types of covers are often transported on a trailer and thus exposed to the elements. In particular, a cover can be subjected to significant forces as a result of the speed at which it is being transported. As such, the cover can have difficulty staying in place and can risk getting blown off the vehicle.

Therefore, there is a need for a vehicle cover that addresses at least some of these drawbacks.

SUMMARY

It is an object of the present technology to ameliorate at least some of the inconveniences present in the prior art.

According to an aspect of the present technology, there is provided a cover for covering at least partially a vehicle. The vehicle has a straddle seat and a footrest extending along a lateral side of the vehicle. The cover has a cover body and a clip connected to the cover body. The clip is configured to be connected to the footrest of the vehicle. The clip includes: a clip body having an inner side and an outer side opposite the inner side, the clip body being fastened to the cover body; an upper connector extending from the inner side of the clip body, the upper connector being configured to engage an upper side of the footrest so as to restrict forward movement of the clip relative to the footrest; and a lower connector extending from the inner side of the clip body, the lower connector being configured to engage a lower side of the footrest. The clip is configured such that, when the clip is connected to the footrest, an edge portion of the footrest is located between the upper and lower connectors.

In some embodiments, the upper connector has an interlocking feature for locking onto part of the edge portion of the footrest to restrict forward movement of the clip relative to the footrest.

In some embodiments, the edge portion of the footrest has a plurality of projections projecting upwardly on the upper side of the footrest, and the interlocking feature has a first portion configured to fit between adjacent ones of the projections so as to restrict forward movement of the clip relative to the footrest.

In some embodiments, the plurality of projections is a plurality of first projections forming a first row. The edge portion of the footrest also has a plurality of second projections projecting upwardly on the upper side of the footrest. The second projections are aligned with one another to form a second row adjacent and parallel to the first row. The interlocking feature also has a second portion configured to fit between one of the first projections and one of the second projections adjacent to the one of the first projections.

In some embodiments, the second portion of the interlocking feature is longer than the first portion of the interlocking feature.

In some embodiments, the second portion of the interlocking feature is closer to the clip body than the first portion of the interlocking feature.

In some embodiments, the first portion of the interlocking feature is centered relative to the second portion of the interlocking feature along a direction generally parallel to the inner side of the clip body.

In some embodiments, the first and second portions of the interlocking feature extend at an angle relative to one another along a plane generally perpendicular to the inner side of the clip body.

In some embodiments, the interlocking feature has a generally V-shaped cross-sectional profile. The first portion of the interlocking feature forms a first side of the V-shaped cross-sectional profile, and the second portion of the interlocking feature forms a second side of the V-shaped cross-sectional profile.

In some embodiments, the clip also has at least one rib interconnecting the first and second portions of the interlocking feature.

In some embodiments, a cross-section of the second portion along a direction generally parallel to the inner side of the clip body is generally trapezoidal. A lengthwise dimension of the trapezoidal cross-section of the second portion is greater at a bottom of the cross-section than at a top of the cross-section.

In some embodiments, a cross-section of the first portion of the interlocking feature along a direction generally parallel to the inner side of the clip body is generally trapezoidal. A lengthwise dimension of the trapezoidal cross-section of the first portion is greater at a top of the cross-section than at a bottom of the cross-section.

In some embodiments, the lower connector has a seat portion configured to receive a lower part of the edge portion of the footrest when the clip is connected to the footrest.

In some embodiments, the lower connector has a lip portion including an angled surface extending inwardly and downwardly. The seat portion is closer to the clip body than the lip portion. When the clip is being engaged to the footrest, the angled surface is configured to contact the edge portion of the footrest and cause the lower connector to flex relative to the clip body so as to widen a gap between the upper and lower connectors. The lower connector is configured to flex back in place when the edge portion of the footrest is past the lip portion and is received in the seat portion.

In some embodiments, the angled surface of the lip portion extends vertically higher than the seat portion.

In some embodiments, at least the lower connector of the clip is made of a polymeric material.

In some embodiments, the clip body, the upper connector and the lower connector form a single integral component.

In some embodiments, the clip body is sewn to the cover body.

In some embodiments, the clip body has a central portion and a peripheral portion at least partially surrounding the central portion. The peripheral portion is thinner than the central portion. At least part of the peripheral portion of the clip body is sewn to the cover body.

In some embodiments, the cover also has an adjustable strap connected between the clip and the cover body. The adjustable strap is configured to adjust a tension in the cover body by selectively adjusting a length of the adjustable strap.

In some embodiments, the clip is disposed at an edge of the cover body.

In some embodiments, the cover is configured to cover at least partially a snowmobile.

In some embodiments, the cover body is made of a soft flexible material.

In some embodiments, the cover body is made of a fabric.

In some embodiments, the cover body is made of water repellent polyester.

In some embodiments, the clip is a first clip, the footrest is a first footrest and the lateral side of the vehicle is a first lateral side of the vehicle. The vehicle has a second footrest extending along a second lateral side of the vehicle. The cover also has a second clip connected to the cover body and configured to be connected to the second footrest of the vehicle. The second clip includes: a clip body having an inner side and an outer side opposite the inner side, the clip body of the second clip being fastened to the cover body; an upper connector extending from the inner side of the clip body of the second clip, the upper connector of the second clip being configured to engage an upper side of the second footrest so as to restrict forward movement of the second clip relative to the second footrest; and a lower connector extending from the inner side of the clip body of the second clip, the lower connector of the second clip being configured to engage a lower side of the second footrest. The second clip is configured such that, when the second clip is connected to the second footrest, an edge portion of the second footrest is located between the upper and lower connectors of the second clip.

According to another aspect of the present technology, there is provided a method for providing a cover on a vehicle. The vehicle has a straddle seat and a footrest extending along a lateral side of the vehicle. The cover has a cover body and a clip connected to the cover body. The method includes: covering a portion of the vehicle with the cover body; engaging an upper connector of the clip with an upper side of an edge portion of the footrest of the vehicle to restrict forward longitudinal movement of the clip relative to the footrest; and engaging a lower connector of the clip with a lower side of the edge portion of the footrest of the vehicle such that the edge portion of the footrest is located between the upper and lower connectors of the clip.

In some embodiments, engaging the upper connector of the clip with the upper side of the edge portion of the footrest includes interlocking the upper connector with a plurality of projections projecting upwardly on the upper side of the edge portion of the footrest to restrict forward longitudinal movement of the clip relative to the footrest.

In some embodiments, the method also includes tightening a strap connected between the clip and the cover body in order to increase tension in the cover body.

In some embodiments, the clip is a first clip. The cover has a second clip connected to the cover body. The footrest is a first footrest and the lateral side of the vehicle is a first lateral side of the vehicle. The vehicle has a second footrest extending along a second lateral side of the vehicle. The method also includes: engaging an upper connector of the second clip with an upper side of an edge portion of the second footrest of the vehicle to restrict forward longitudinal movement of the second clip relative to the second footrest; and engaging a lower connector of the second clip with a lower side of the edge portion of the second footrest of the vehicle such that the edge portion of the second footrest is located between the upper and lower connectors of the second clip.

In some embodiments, the vehicle is a snowmobile. Covering the portion of the snowmobile with the cover body includes covering a seat, a handlebar, a hood and part of the footrest of the snowmobile.

According to another aspect of the present technology, there is provided a cover for covering at least partially a vehicle. The vehicle has a seat and a footrest extending along a lateral side of the vehicle. The footrest has at least one projection. The cover includes: a cover body configured to cover a portion of the vehicle; a clip connected to the cover body and configured to be connected to the footrest of the vehicle; and an adjustable strap having a first end and a second end. The clip includes: a clip body having an inner side and an outer side opposite the inner side, the clip body being fastened to the cover body; and a connector extending from the inner side of the clip body, the connector being configured to engage the at least one projection of the footrest so as to restrict forward movement of the clip relative to the footrest. The first end of the adjustable strap is connected to one of the clip and the cover body. The second end of the adjustable strap is connected to the cover body. Tightening the adjustable strap pulls the first end towards the second end to cause the connector to engage with the at least one projection and increase longitudinal tension in the cover body.

For purposes of this application, terms related to spatial orientation when referring to the vehicle orientation such as forwardly, rearwardly, left, and right are as they would normally be understood by a driver of the vehicle sitting thereon in a normal riding position.

Embodiments of the present each have at least one of the above-mentioned aspects, but do not necessarily have all of them.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects and further features thereof, reference is made to the following description which is to be used in conjunction with the accompanying drawings, where:

FIG. 5 is an outer lateral side elevation view of the clip of FIG. 4;

FIG. 6 is a inner lateral side elevation view of the clip of FIG. 4;

DETAILED DESCRIPTION

Embodiments of vehicle covers will be described with respect to their use with snowmobiles. It is contemplated that the covers could be adapted to other types of vehicles. For example, the covers could be used in ATVs, three-wheeled motorized vehicles or motorcycles.

There will now be described a snowmobile 100 on which a cover 200 can be used. It should be understood that the snowmobile 100 is only one possible example of a snowmobile that can be covered with the cover 200.

Figure 1:
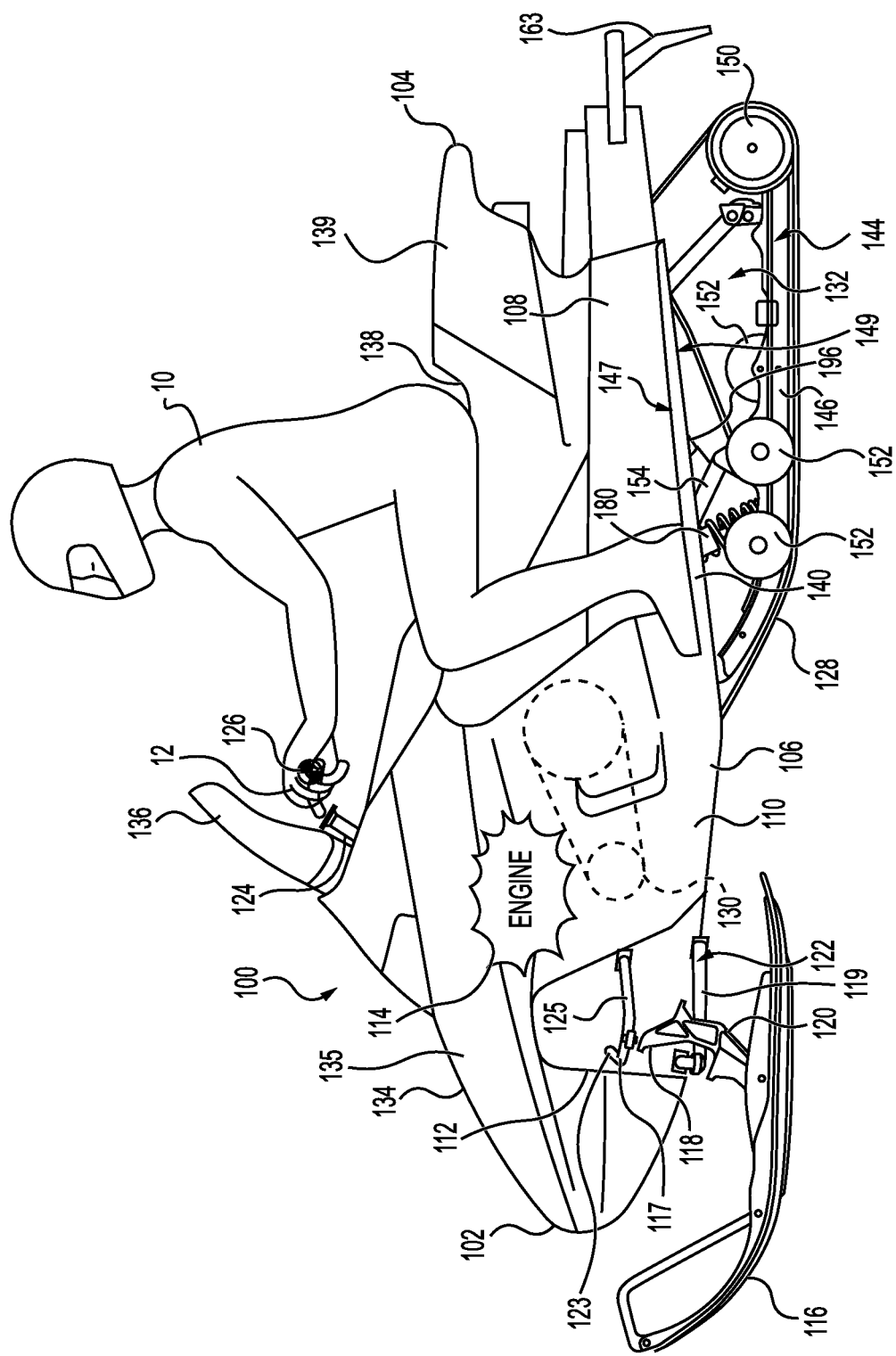
FIG. 1 is a left side elevation view of a snowmobile with a user thereon.

Referring now to FIG. 1, the snowmobile 100 has a front end 102 and a rear end 104, which are defined consistently with the forward travel direction of the vehicle. The snowmobile 100 includes a chassis 106 which includes a tunnel 108, an engine cradle portion 110 and a front suspension assembly portion 112.

An engine 114, which is schematically illustrated, is carried by the engine cradle portion 110 of the chassis 106. A ski and steering assembly is provided, in which two skis 116 (only one of which is shown in FIG. 1) are positioned at the front end 102 of the snowmobile 100, and are attached to the front suspension assembly portion 112 of the chassis 106 through a front suspension assembly 118.

The front suspension assembly 118 includes ski legs 120, supporting arms 122, spindles and ball joints for operatively joining the respective ski legs 120, supporting arms 122 and a steering column 124. The arms 122 includes left and right upper A-arms 117 and left and right lower A-arms 119 (only left upper and lower A-arms 117, 119 being shown in FIG. 1). The upper A-arms 117 and lower A-arms 119 have each a front portion 123 and a rear portion 125. It is contemplated that the front suspension assembly 118 could be different from a double A-arm suspension described above.

The steering column 124 at its upper end is attached to a handlebar 126 which is positioned forward of a user 10 and behind the engine 114 to rotate the ski legs 120 and thus the skis 116, in order to steer the vehicle.

An endless drive track 128 is positioned at the rear end 104 of the snowmobile 100 and is disposed under the tunnel 108. The endless drive track 128 is operatively connected to the engine 114 through a belt transmission system 130 which is schematically illustrated in broken lines. Thus, the endless drive track 128 is driven to run about a rear suspension assembly 132 for propulsion of the snowmobile 100.

The rear suspension assembly 132 comprises a front shock absorber 180 and a rear shock absorber 196. The front shock absorber 180 extends rearwardly and downwardly from a front portion of the tunnel 108, and is disposed between the tunnel 108 and a slide frame assembly 144, partially forward of front suspension arms 154 of the rear suspension assembly 132. The rear shock absorber 196 extends forwardly and downwardly from a rear portion of the tunnel 108, and is disposed at least in part rearwardly of the front suspension arms 154. The suspension assembly 132 comprises other elements well known in the art, and as such they will not be described herein.

The endless drive track 128 is engaged with and driven by a drive sprocket (not shown) which is journaled by the tunnel 108 and is driven by the engine 114 through the belt transmission system 130. The slide frame assembly 144 primarily includes a pair of spaced apart slide rails 146 that engage the inner side of the ground-engaging portion of the endless drive track 128. The slide frame assembly 144 journals a plurality of backup rollers (not shown) and four idler rollers 150. In addition, further rollers 152 are carried by the tunnel 108, in order to define the path over which the endless drive track 128 travels.

At the front end 102 of the snowmobile 100, fairings 134 are provided that enclose the engine 114 and the belt transmission system 130, thereby providing an external shell that not only protects the engine 114 and the belt transmission system 130, but also make the snowmobile 100 more aesthetically pleasing. The fairings 134 include a hood 135 and one or more side panels which can be opened to allow access to the engine 114 and the belt transmission system 130 when this is required, for example for inspection or maintenance of the engine 114 and/or the belt transmission system 130. A windshield 136 is connected to the fairings 134 near the front end 102 of the snowmobile 100. Alternatively, the windshield 136 can be attached directly to the handlebar 126. The windshield 136 acts as a windscreen to lessen the force of the air on the user 10 while the snowmobile 100 is moving.

At the rear end 104 of the snowmobile 100, a snow flap 163 is connected to a rear end of the tunnel 108. The snow flap 163 protects against dirt that could be projected from the drive track 128 when driving. It is contemplated that the snow flap 163 could be omitted.

A straddle seat 138 is disposed rearward of the handlebar 126. A rear portion 139 of the straddle seat 138 may include a storage compartment, or may be used to accept a passenger seat.

Two footrests 140 (only one of which is shown in FIG. 1) extend along opposite lateral sides of the snowmobile 100 below the straddle seat 138 to accommodate the rider's feet. The footrests 140 will be described with reference to FIG. 2 which illustrates a left footrest 140. The right footrest 140 is a mirror image of the left footrest 140 and thus it is understood that the description of the left footrest 140 also applies to the right footrest 140.

Figure 2:
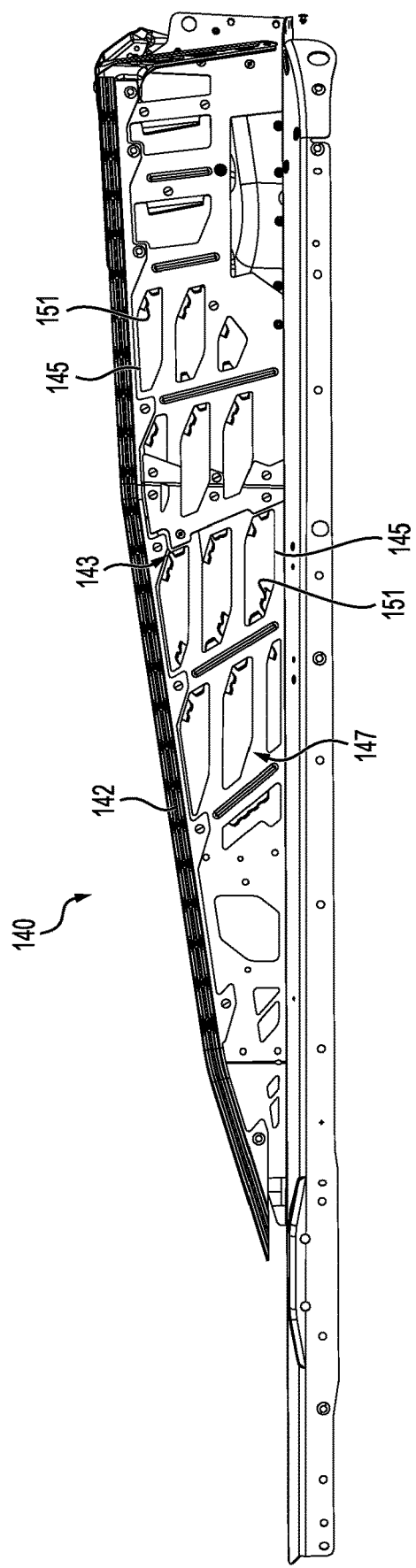
FIG. 2 is a top plan view of a footrest of the snowmobile of FIG. 1.

As can be seen in FIG. 2, the footrest 140 has an external edge portion 142 and an inner portion 143. The inner portion 143 of the footrest 140 defines a plurality of apertures 145 extending from an upper side 147 to a lower side 149 of the footrest 140. The inner portion 143 also has gripping elements 151 which generally extend upwardly from the upper side 149 of the footrest 140 to grip the soles of the rider's boots. The inner portion 143 of the footrest 140 extends outwardly from the tunnel 108. Notably, in this embodiment, the inner portion 143 of the footrest 140 is made integrally with the tunnel 108.

Figure 11:
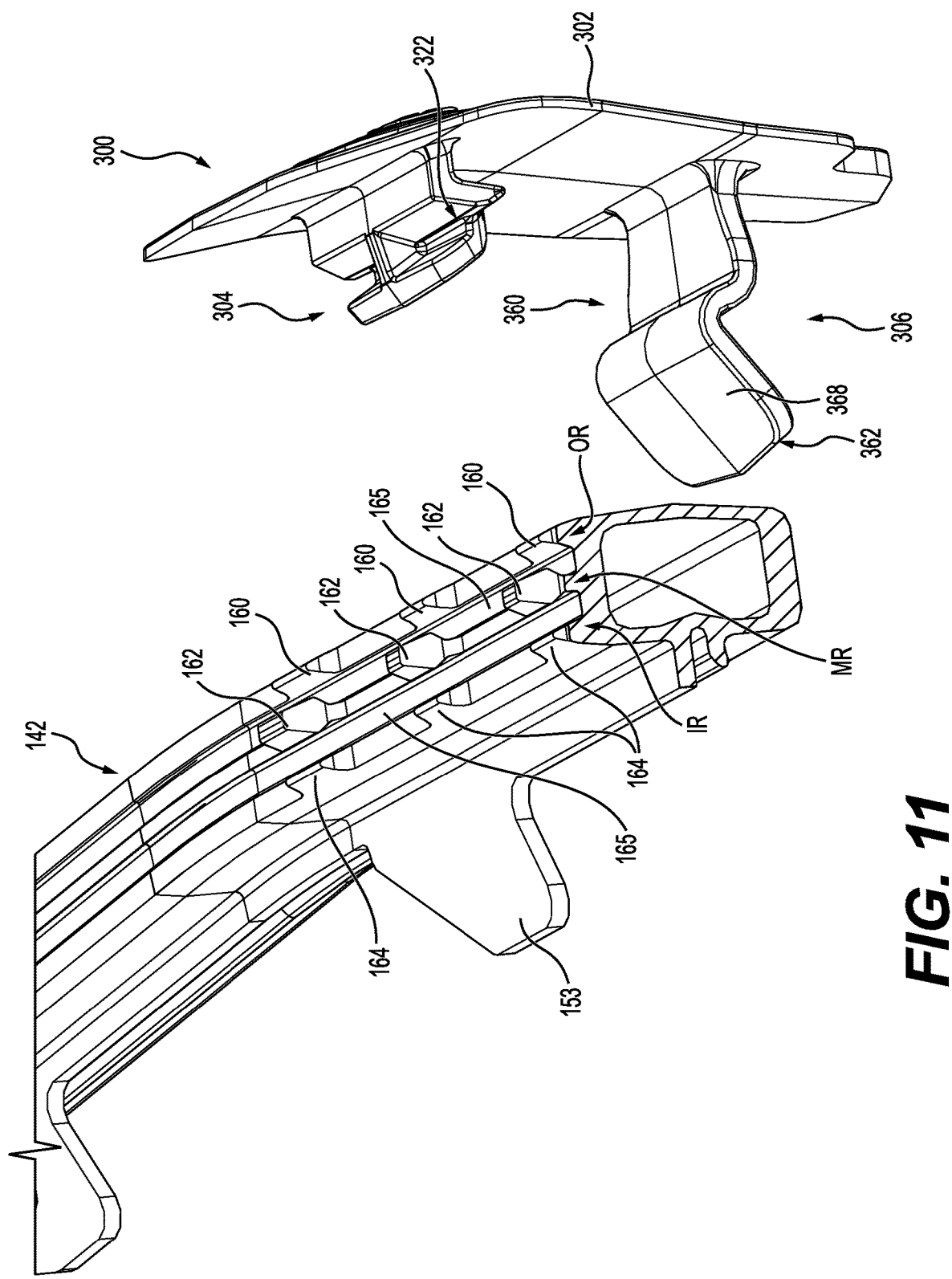
FIG. 11 is a perspective view, taken from a top, inner lateral side, of the clip of FIG. 4 and a part of an edge portion of the footrest of FIG. 2.

The edge portion 142 of the footrest 140 is a laterally-outermost portion of the footrest 140 which is removably connected to the inner portion 143. To that end, the edge portion 142 has a plurality of connectors 153 (only one of which is shown in FIG. 11) which are arranged to lock onto the inner portion 143 of the footrest 140. The edge portion 142 is sometimes alternatively referred to as a "roller". As shown in FIG. 11, the edge portion 142 has a plurality of projections projecting upwardly on the upper side 147 of the footrest 140, including a plurality of outer projections 160, a plurality of middle projections 162 and a plurality of inner projections 164. Two generally continuous grooves 165 respectively separate the outer projections 162 from the middle projections 162 and the middle projections 162 from the inner projections 164. The outer projections 160 are laterally aligned with one another to form an outer row OR of the outer projections 160. The middle projections 162 are laterally aligned with one another to form a middle row MR of the middle projections 162 that is adjacent and parallel to the outer row OR. The inner projections 164 are laterally aligned with one another to form an inner row IR of the inner projections 164 that is adjacent and parallel to the middle row MR. During use of the snowmobile 100, the projections 160, 162, 164 are used for gripping the soles of the rider's boots. As will be explained below, at least some of the projections 160, 162, 164 are used to secure a cover on the snowmobile 100.

The snowmobile 100 includes other elements well known in the art, and as such they will not be described in detail herein.

Figure 3:
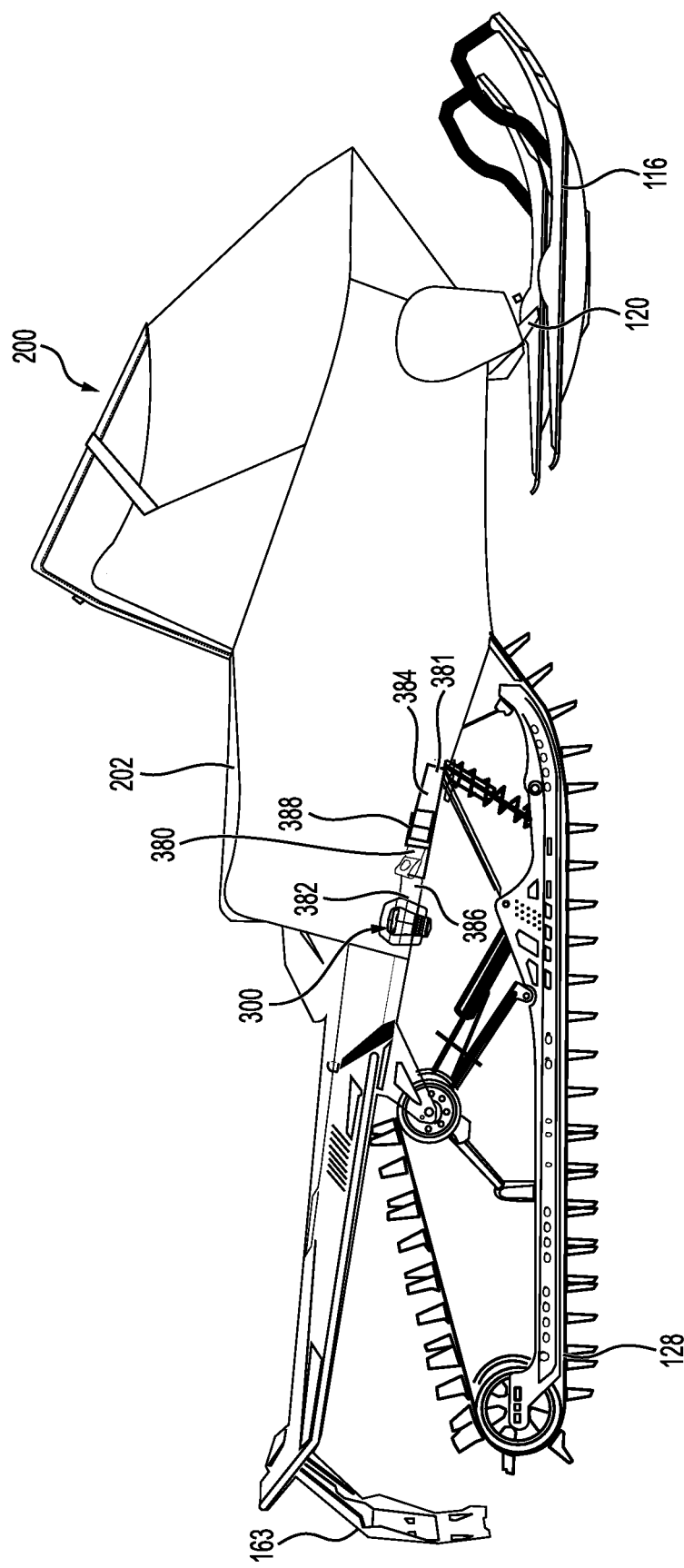
FIG. 3 is a right side elevation view of a cover covering the snowmobile of FIG. 1.

Referring now to FIG. 3, the cover 200 for the snowmobile 100 will be described.

The cover 200 is a removable protective cover that is disposed over the snowmobile 100 when the snowmobile is not in use. The cover 200 is intended to protect the snowmobile 100 from elements of nature (snow, dirt, sun, etc.). The cover 200, when covering the snowmobile as shown in FIG. 3, covers the snowmobile 100 longitudinally from the front 102 up to the rear portion 139 of the seat 138, and laterally from the edge portion 142 of the left footrest 140 to the edge portion 142 of the right footrest 140. It is contemplated that the cover 200 could cover more or less of the snowmobile 100. It is also contemplated that more than one cover could be used or that the cover 200 could be made of multiple sections selectively connected to each other.

The cover 200 includes a cover body 202 and two clips 300 disposed along lateral sides of the cover body 202. In particular, the clips 300 are disposed at an edge of the cover body 202 and on the outer lateral sides thereof. It is contemplated that the clips 300 could be disposed on the inner lateral sides of the cover body 202. The cover body 202 is made of a fabric that is suitable to protect the snowmobile 100 from rain, wind, etc. Notably, in this embodiment, the cover body 202 is made of water repellent polyester which repels water, and is resistant to wind and to freezing temperatures. It is contemplated that the cover body 202 could be made of other materials such as cotton or nylon or other similar materials. The material of the cover body 202 is soft and flexible such that the cover body 202 can be folded for storage of the protective cover 200 when the snowmobile 100 is in use.

In this embodiment, the clips 300 are fixedly connected to the cover body 202. Notably, as will be explained in more detail below, the clips 300 are sewn to the cover body 202. It is contemplated that the clips 300 could be glued or fixedly connected to the cover body 202 by other means (e.g., via rivets). It is also contemplated that the clips 300 could be removably connected to the cover body 202. For example, the clips 300 could be removably connected to the cover body 202 by a zipper, snaps, hook and loop fasteners or buttons.

The clips 300 include a left side clip 300 and a right side clip 300. When the cover 200 covers the snowmobile 100, the left side clip 300 connects the cover 200 to the left footrest 140 while the right side clip 300 connects the cover 200 to the right footrest 140. It is contemplated that more than one left side clip 300 and one right side clip 300 could be used in other embodiments.

Each clip 300 is integrally formed and is made of nylon which is a resilient plastic. The clips 300 can be flexed and recover their original shape once the force to flex them is removed. It is contemplated that the clips 300 could be made of a resilient material other than nylon and other than a plastic, which would remain flexible in temperatures ranging from +40 to −40 degrees C. For example, the clips 300 could be made of a resilient metal. It is also contemplated that only a portion of the clips 300 could be resilient. It is also contemplated that the clips 300 could not be resilient. For example, the clips 300 could have a single loaded hinge. It is also contemplated that the clips 300 could not be integrally formed. The clips 300 will be described in greater detail below.

Referring now to FIGS. 4 to 9, a first embodiment of the clips 300 of the protective cover 200 will be described in greater detail. Since both clips 300 are identical, only one of the clips 300 will be described. It is contemplated that the clips 300 could be different from each other.

The clip 300 has a clip body 302 and two connectors 304, 306 extending from an inner side 308 of the clip body 302. The connectors 304, 306 include an upper connector 304 and a lower connector 306 disposed below the upper connector 304. As will be described in greater detail below, the upper and lower connectors 304, 306 are configured to engage the edge portion 142 of a corresponding one of the footrests 140.

Figure 9:
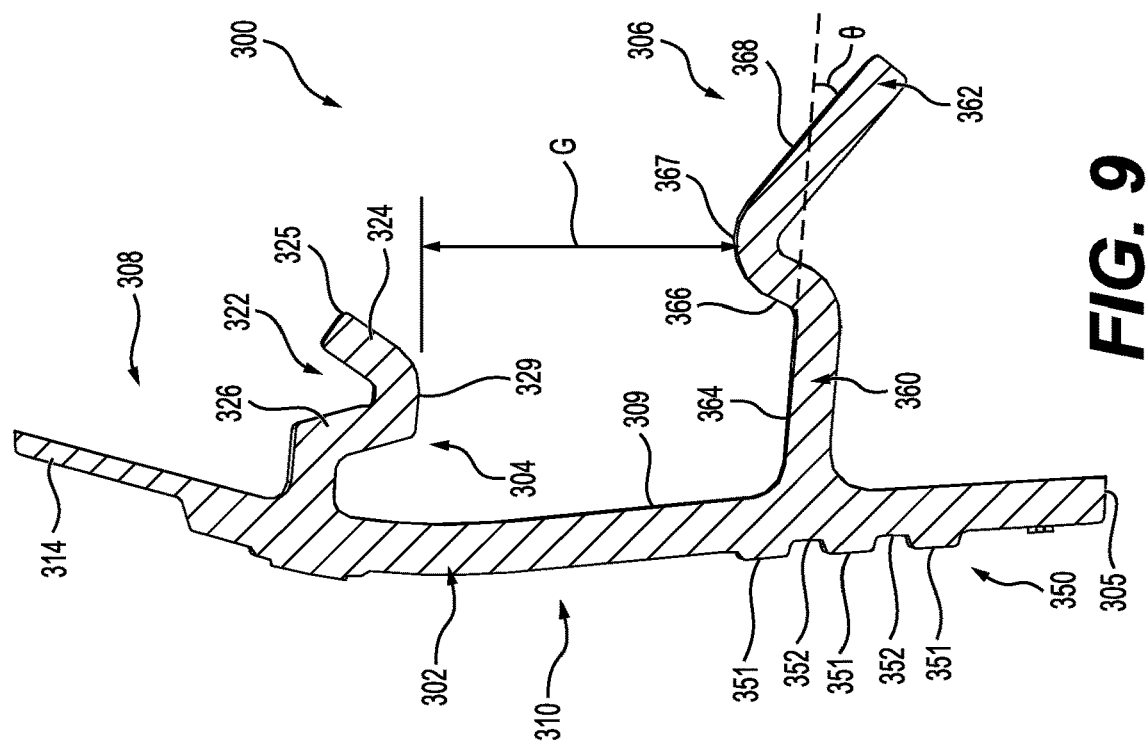
FIG. 9 is a cross-section of the clip of FIG. 4 taken along line 9-9 in FIG. 7.
Figure 8:
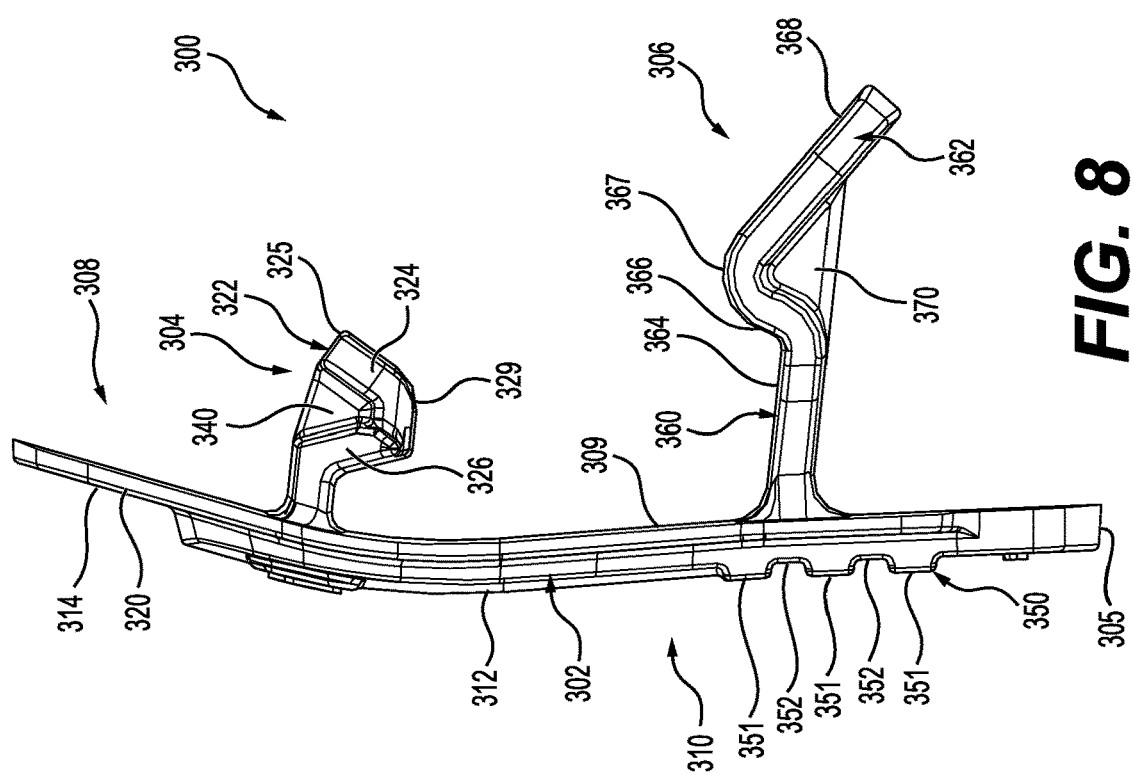
FIG. 8 is a front elevation view of the clip of FIG. 4.
Figure 10:
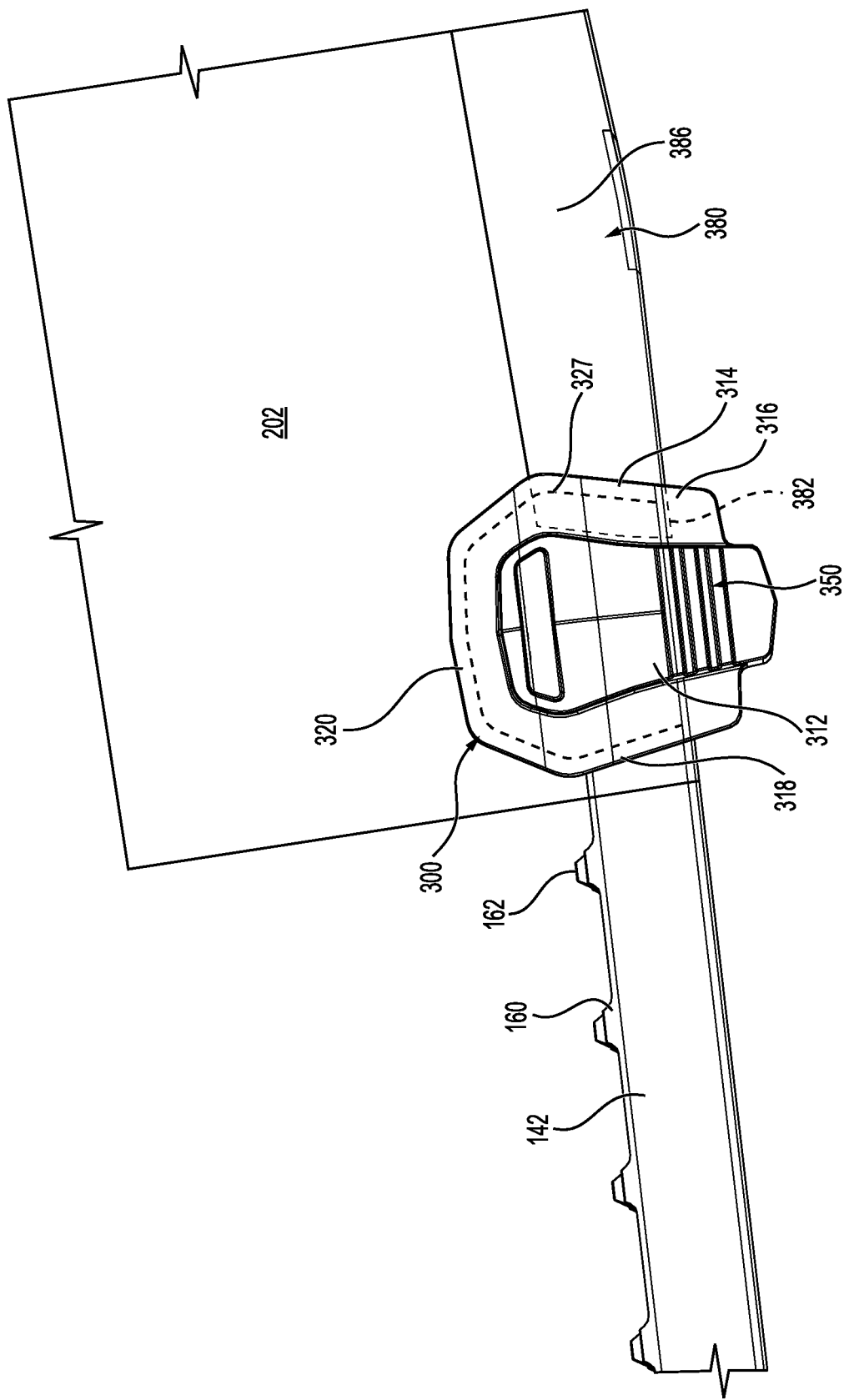
FIG. 10 is an outer lateral side view of part of the cover, including part of an adjustable strap and the clip of FIG. 4 engaged with the footrest.

With reference to FIGS. 8 and 9, the clip body 302 has a central portion 312 and a peripheral portion 314 surrounding the central portion 312. The peripheral portion 314 is thinner than the central portion 312 in order to facilitate sewing of the peripheral portion 314 to the cover body 202 of the cover 200. For instance, as shown in FIG. 10, in this embodiment, as denoted by stitching 327, the clip body 302 is sewn to the cover body 202 along parts of a front peripheral portion 316, a rear peripheral portion 318 and an upper peripheral portion 320 of the peripheral portion 314. It is contemplated that a greater or a lesser expanse of the peripheral portion 314 may be sewn to the cover body 202 in other embodiments. Moreover, it is contemplated that, in other embodiments, the peripheral portion 314 may have the same thickness as the central portion 312 (e.g., in embodiments in which the clip 300 is glued to the cover body 202).

In this embodiment, as shown in FIGS. 5, 8 and 9, the central portion 312 of the clip body 302 has a textured outer surface 350 on the outer side 310 of the clip body 302 to facilitate handling of the clip 300 by a user. The textured outer surface 350 could be configured in various ways. In this embodiment, as shown in FIGS. 8 and 9, the textured outer surface 350 is formed by a plurality of raised surface sections 351 extending generally longitudinally and separated from one another by a plurality of grooves 352.

Furthermore, in this embodiment, the clip 300 can be used to remove ice that can tend to form on the footrests 140 during use. To that end, in this embodiment, as shown in FIG. 5, a lower portion 303 of the clip 300, including a lower end 305 of the clip body 302, is shaped to brake or scrape ice therewith. Notably, the lower end 305 of the clip body 302 has two corners 311 and two converging edges 307 that extend from the corners 311 and converge at an apex 309 pointing downwardly. Thus, in this embodiment, the lower end 305 has a pointed shape. The corners 311 of the lower end 305 of the clip body 302 facilitate scraping or breaking ice therewith, particularly ice that has formed at the edge portion 142 of the footrest 140 where the clip 300 is to be connected. In particular, as the lower portion 303 of the clip 300 is narrower than the grooves 165 (i.e., the thickness of the lower portion 303, between the inner and outer sides 308, 310 of the clip body 302, is less than the width of the grooves 165), the lower portion 303 of the clip 300 can be inserted into the grooves to clear the grooves 165 from accumulated ice and snow. It is contemplated that the lower edge 305 may be shaped differently in other embodiments. For instance, in other embodiments, the lower end 305 may not be pointed and may instead be square or rectangular.

Figure 4:
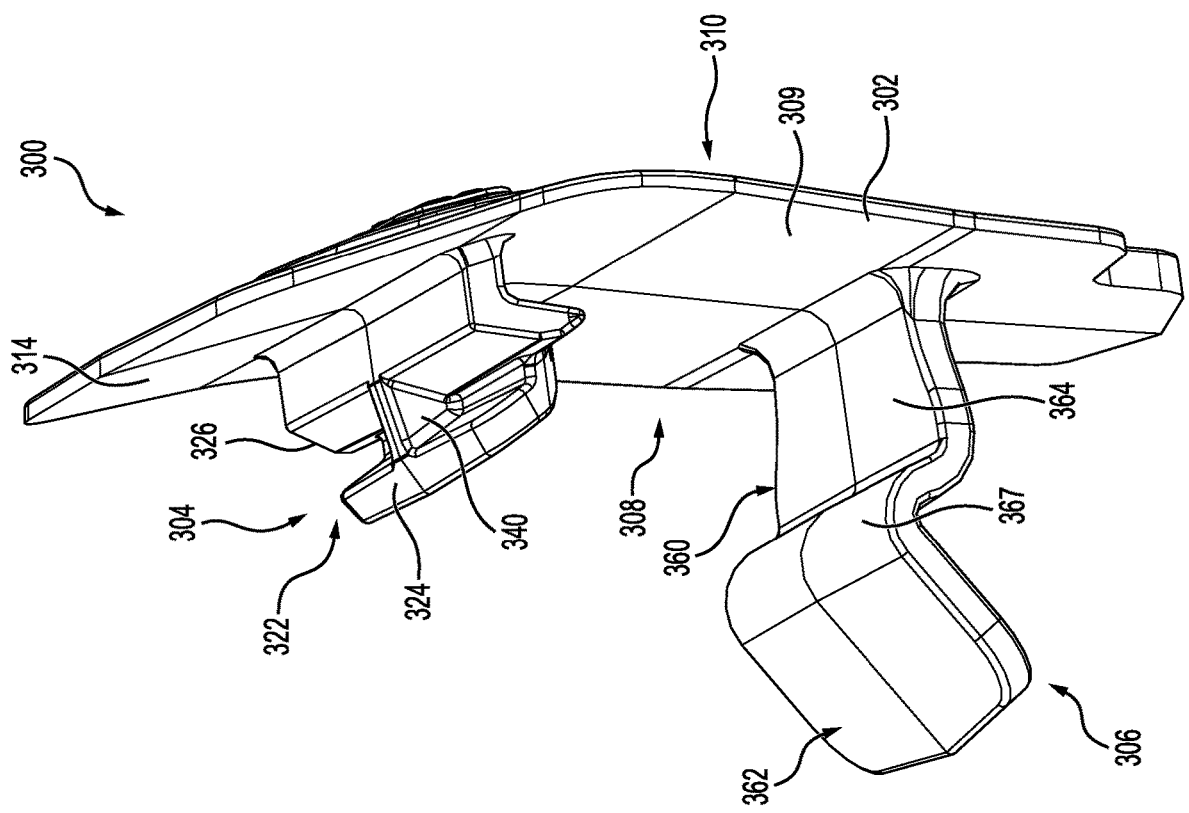
FIG. 4 is a perspective view, taken from a top, inner lateral side, of a clip of the cover of FIG. 3.
Figure 7:
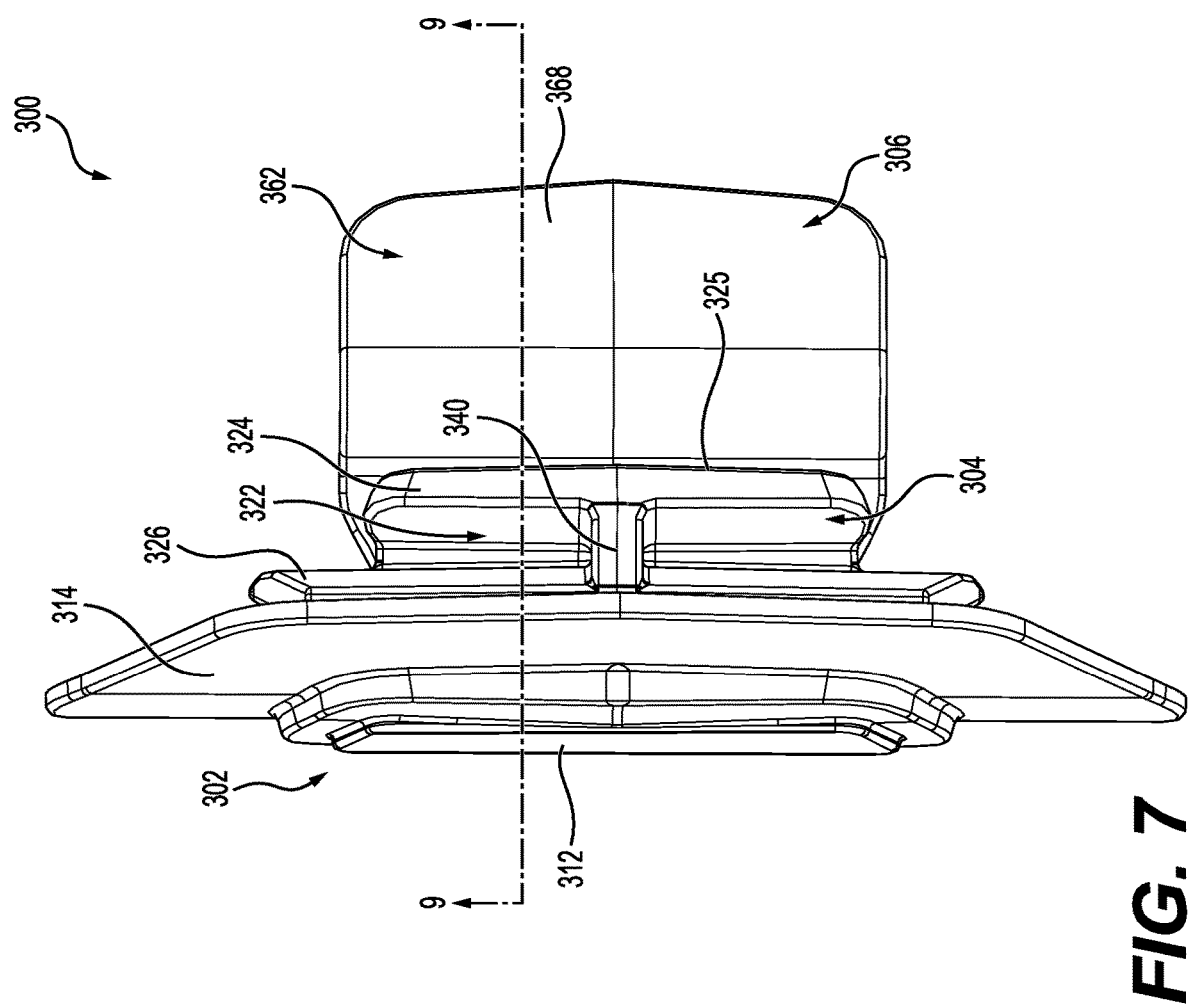
FIG. 7 is a top plan view of the clip of FIG. 4.

The upper connector 304 is configured to engage the upper side 147 of the corresponding footrest 140 so as to restrict movement of the clip 300 relative to the footrest 140. To that end, as shown in FIG. 4, the upper connector 304 has an interlocking feature 322 for locking onto part of the edge portion 142 of the footrest 140. Notably, the interlocking feature 322 has first and second portions 324, 326 which engage the projections 160, 162 on the upper side of the edge portion 142 of the footrest 140 so as to restrict movement of the clip 300 relative to the footrest 140 in different directions.

Figure 14:
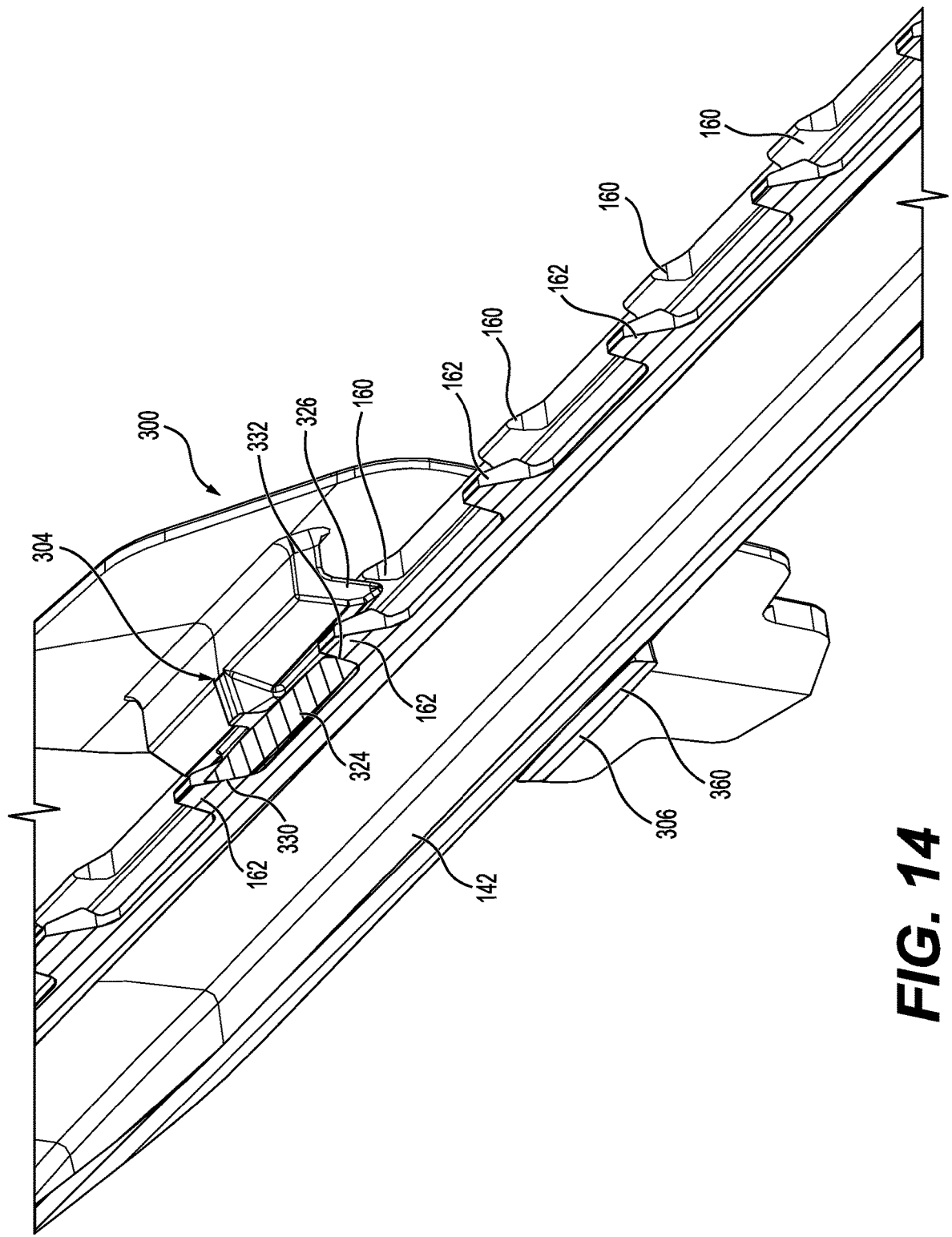
FIG. 14 is a perspective view, taken from a top, inner lateral side of a cross-section of the clip and the edge portion.

The first portion 324 of the interlocking feature 322 is configured to engage the middle projections 162 of the edge portion 142 to restrict longitudinal movement (i.e., forward and rearward movement) of the clip 300 relative to the footrest 140. More specifically, the first portion 324 fits between two longitudinally-adjacent ones of the middle projections 162 so that the clip 300 is restricted from moving longitudinally. Notably, as shown in FIG. 14, in this embodiment, the first portion 324 fits snuggly between two longitudinally-adjacent ones of the projections 162 so that, when the interlocking feature 322 engages the edge portion 142 of the footrest 140, a front end 330 of the first portion 324 is in contact with one of the middle projections 162 while a rear end 332 of the first portion 324 is in contact with a rear longitudinally-adjacent one of the middle projections 162. The fit of the first portion 324 between the longitudinally-adjacent middle projections 162 may be looser in other embodiments. That is, in some embodiments, the first portion 324 may be dimensioned such that there is some play between the first portion 324 and the longitudinally-adjacent ones of the middle projections 162.

In this embodiment, as shown in FIG. 14, the first portion 324 of the interlocking feature 322 is shaped such that a cross-section of the first portion 324 along a direction generally parallel to the inner side 308 of the clip body 302 is generally trapezoidal. Moreover, the trapezoidal cross-section of the first portion 324 is oriented such that the widest base thereof is at a top of the first portion 324. In other words, a lengthwise dimension of the trapezoidal cross-section of the first portion 324 is greater at a top of the cross-section than at a bottom of the cross-section.

The second portion 326 of the interlocking feature 322 is configured to engage the projections 160, 162 of the outer and middle rows OR, MR of the edge portion 142 of the footrest 140. More specifically, the second portion 326 fits between laterally-adjacent ones of the outer projections 160 and the middle projections 162 so as to restrict lateral movement (i.e., side to side movement) of the clip 300 relative to the footrest 140. Notably, this limits lateral movement of the first portion 324 of the interlocking feature 322 and thus helps prevent the first portion 324 from disengaging the middle row MR of the middle projections 162.

In this embodiment, as the outer projections 160 are generally longitudinally aligned with the middle projections 162, the second portion 326 of the interlocking feature 322 is longer than the first portion 324. Specifically, as shown in FIG. 6, a front end 334 of the second portion 326 is located forwardly of the front end 330 of the first portion 324 while a rear end 336 of the second portion 326 is located rearwardly of the rear end 332 of the first portion 324. Moreover, in this embodiment, the first portion 324 is centered relative to the second portion 326 along a direction generally parallel to the inner side 308 of the clip body 302. In other words, a longitudinal distance between the front ends 330, 334 of the first and second portions 324, 326 is approximately the same as a longitudinal distance between the rear ends 332, 336 of the first and second portions 324, 326.

In this embodiment, as shown in FIG. 6, the second portion 326 of the interlocking feature 322 is shaped such that a cross-section of the second portion 326 along a direction generally parallel to the inner side 308 of the clip body 302 is generally trapezoidal. Moreover, the trapezoidal cross-section of the second portion 326 is oriented such that the widest base thereof is at a bottom of the second portion 326. In other words, a lengthwise dimension of the trapezoidal cross-section of the second portion 326 is greater at a top of the cross-section than at a bottom of the cross-section.

Moreover, as can be seen in FIGS. 8 and 9, in this embodiment, the second portion 326 is closer to the clip body 302 than the first portion 324. Notably, the first portion 324 defines an inner end 325 of the upper connector 304. It is contemplated that, in other embodiments, the positions of the first and second portions 324, 326 of the interlocking feature 322 could be reversed such that the first portion 324 is closer to the clip body 302 than the second portion 326.

As can be seen in FIG. 9, the first and second portions 324, 326 of the interlocking feature 322 extend at an angle relative to one another along a plane generally perpendicular to the inner side 308 of the clip body 302. As such, the interlocking feature 322 has a generally V-shaped cross-sectional profile, whereby the first portion 324 forms one side of the V-shaped cross-sectional profile while the second portion 326 forms the opposite side of the V-shaped cross-sectional profile. A reinforcing rib 340 interconnects the first and second portions 324, 326 to rigidify the connection therebetween.

Figure 13:
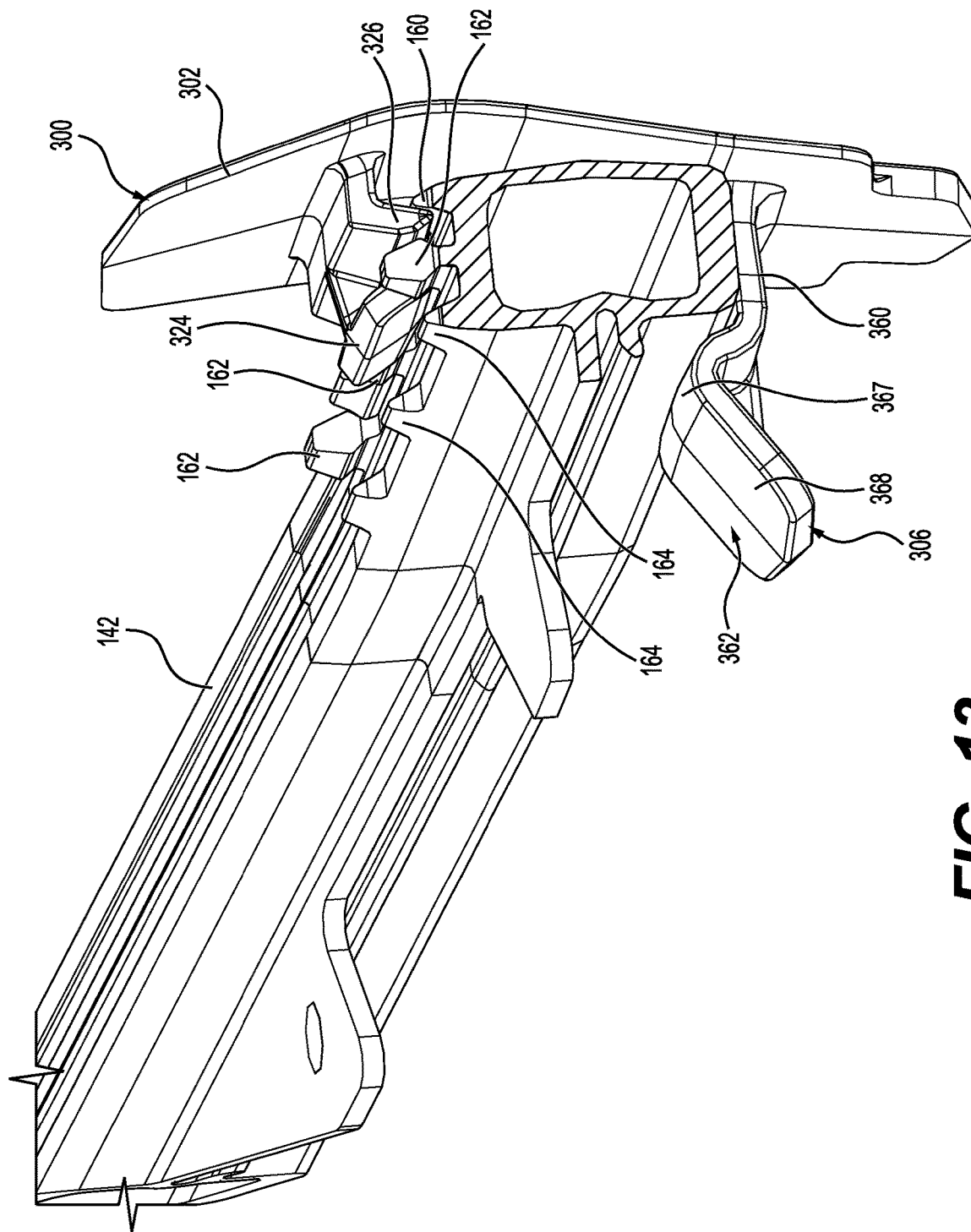
FIG. 13 is a perspective view of the clip engaged with the edge portion of the footrest.

With reference to FIG. 4, the lower connector 306 of the clip 300 has a seat portion 360 and a lip portion 362. The seat portion 360 is closer to the clip body 302 than the lip portion 362. As shown in FIG. 13, the seat portion 360 is configured to receive a lower part of the edge portion 142 of the footrest 140 when the clip 300 is connected to the footrest 140. The seat portion 360 could be shaped in various ways. Notably, the shape of the seat portion 360 is adapted according to the shape and dimensions of the edge portion 142 to which the clip 300 is intended to be clipped onto. As shown in FIGS. 8 and 9, in this embodiment, as the edge portion 142 has a generally rectangular cross-sectional profile, the seat portion 360 is defined by a flat bottom wall 364 and a lateral side wall 366 that extends upwardly from the bottom wall 364 at one end thereof. At the other end of the bottom wall 364, an inner surface 309 of the clip body 302 extends generally perpendicular to the bottom wall 364. As such, the seat portion 360 accommodates a lower part of the edge portion 142 between the lateral side wall 366 and the inner surface 309 of the clip body 302. It is contemplated that the seat portion 360 could have a different shape in other embodiments (e.g., a curved shape).

The lip portion 362 of the lower connector 306 is configured to momentarily engage the lower part of the edge portion 142 of the footrest 140 as the clip 300 is being clipped onto the footrest 140. Notably, as will be explained in greater detail below, when the clip 300 is being engaged to the footrest 140, the lip portion 362 engages the lower part of the edge portion 142 of the footrest 140 to cause elastic deformation of the lower connector 306 relative to the clip body 302. The lip portion 362 includes a curved upper surface 367 and an angled upper surface 368 which extends inwardly and downwardly from the curved upper surface 367. The curved upper surface 367 extends inwardly from the lateral side wall 366 of the seat portion 360 and is continuous therewith. The curved upper surface 367 defines an uppermost point of the lip portion 362 and of the lower connector 306. As such, the lip portion 362 extends vertically higher than the seat portion 360. As shown in FIG. 9, the angled upper surface 368 extends at an angle $\theta$ relative to the bottom wall 364 of the seat portion 360. In this embodiment, the angle $\theta$ is approximately 45°. It is contemplated that the angle $\theta$ could have any other suitable value in other embodiments.

As can be seen in FIGS. 8 and 9, in this embodiment, the seat portion 360 and the lip portion 362 of the lower connector 306 have a constant thickness. As such, an underside of the lip portion 362 generally follows the profile of the curved upper surface 367 and the angled upper surface 368. Moreover, as shown in FIG. 8, a reinforcing rib 370 extends between the seat portion 360 and the lip portion 362 on the underside of the lower connector 306.

In this embodiment, the clip body 302 and the upper and lower connectors 304, 306 form a single integral component. Notably, the clip 300 is molded in such a way that the entire clip 300 is made of the same material. Namely, as mentioned above, in this embodiment, the clip 300 is made of polymeric material. It is however contemplated that, in other embodiments, different parts of the clip 300 could be made from different materials (e.g., the lower connector 306 could be made from a different material than the upper connector 304).

With reference to FIG. 3, the cover 200 also includes two adjustable straps 380 for adjusting a tension in the cover body 202. Each of the two adjustable straps 380 is disposed along a respective lateral side of the cover body 202 and is connected between a corresponding one of the clips 300 (on the same lateral side of the cover body 202) and the cover body 202. As both adjustable straps 380 are identical, only one of the straps 380 will be described herein.

As shown in FIG. 3, the adjustable strap 380 has two ends 381, 382 that define a length of the adjustable strap 380 therebetween. The adjustable strap 380 includes a front strap portion 384 and a rear strap portion 386, each defining a respective one of the ends 381, 382 of the adjustable strap 380. In this embodiment, the strap portions 384, 386 are made of nylon webbing. The strap portions 384, 386 could be made of any other suitable material in other embodiments. An adjuster buckle 388 interconnects the two strap portions 384, 386 and allows a length of the rear strap portion 386 (and thus a length of the adjustable strap 380) to be adjusted thereby. Notably, the rear strap portion 386 is wrapped around the buckle 388 in a known manner to allow a user to selectively adjust the length of the adjustable strap 380.

In this embodiment, the front end 381 of the adjustable strap 380 is connected to the cover body 202 at a location forward of the corresponding clip 300, and the rear end 382 of the adjustable strap 380 is connected to the clip body 302 of the corresponding clip 300. As such, tightening the adjustable strap 380 brings the front and rear ends 381, 382 closer to one another (i.e., increasing the tension in the cover body 202) while loosening the adjustable strap 380 distances the front and rear ends 381, 382 from one another (i.e., decreasing the tension in the cover body 202).

In some embodiments, the front end 381 of the adjustable strap 380 may be connected to the clip body 302 of the corresponding clip 300 while the rear end 382 is connected to the cover body 202 at a location rearward of the corresponding clip 300. For instance, this may be the case in embodiments in which the cover 200 is adapted to cover the tunnel 108.

Moreover, in some embodiments, both the front and rear ends 381, 382 of the adjustable strap 380 could be connected to the cover body 202. In such embodiments, tightening the adjustable strap 380 brings the front and rear ends 381, 382 closer to one another which in turn causes the connector 304 to engage one of the projections 162 of the edge portion 142 of the corresponding footrest 140 resulting in an increase in the longitudinal tension of the cover body 202.

Furthermore, the adjustable strap 380 could extend in different directions in other embodiments. For instance, the adjustable strap 380 could be connected between the left and right clips 300 (i.e., extend vertically and laterally from either of the clips 300), or between one of the left and right clips 300 and the cover body 202 at a location laterally inward of the corresponding clip 300. This is shown for example in the embodiment depicted in FIG. 16 in which a left clip 300 is connected to a right clip 300 by an adjustable strap.

The adjustable strap 380 can be connected to the clip body 302 and to the cover body 202 in any suitable way. In this embodiment, as shown in FIG. 10, the ends 381, 382 of the adjustable strap 380 are sewn to the cover body 202 and the clip body 302 (only the rear end 382 being shown in FIG. 10). For instance, the rear end 382 of the adjustable strap 380 is sewn to the front peripheral portion 316 of the clip body 302. It is contemplated that, in other embodiments, the ends 381, 382 of the adjustable strap 380 may be glued, or otherwise fastened to the cover body 202 and the clip body 302.

It is contemplated that, in some embodiments, the clip 300 could have a tensioning system (e.g., a buckle) to adjust the tension of the adjustable strap 380.

The manner in which the cover 200 is provided on the snowmobile 100 via the clips 300 and the adjustable straps 380 in order to cover part of the snowmobile 100 will now be described with reference to FIGS. 3 and 11 to 13.

First, as shown in FIG. 3, the cover 200 is placed on the snowmobile 100 such that the cover body 202 extends over and covers the portion of the snowmobile 100 that is intended to be covered. In this embodiment, the cover body 202 covers the seat 138, the handlebar 126, the hood 135 and part of each of the footrests 140 of the snowmobile 100. It is contemplated that the cover body 202 could cover other parts of the snowmobile 100 in other embodiments.

Figure 12:
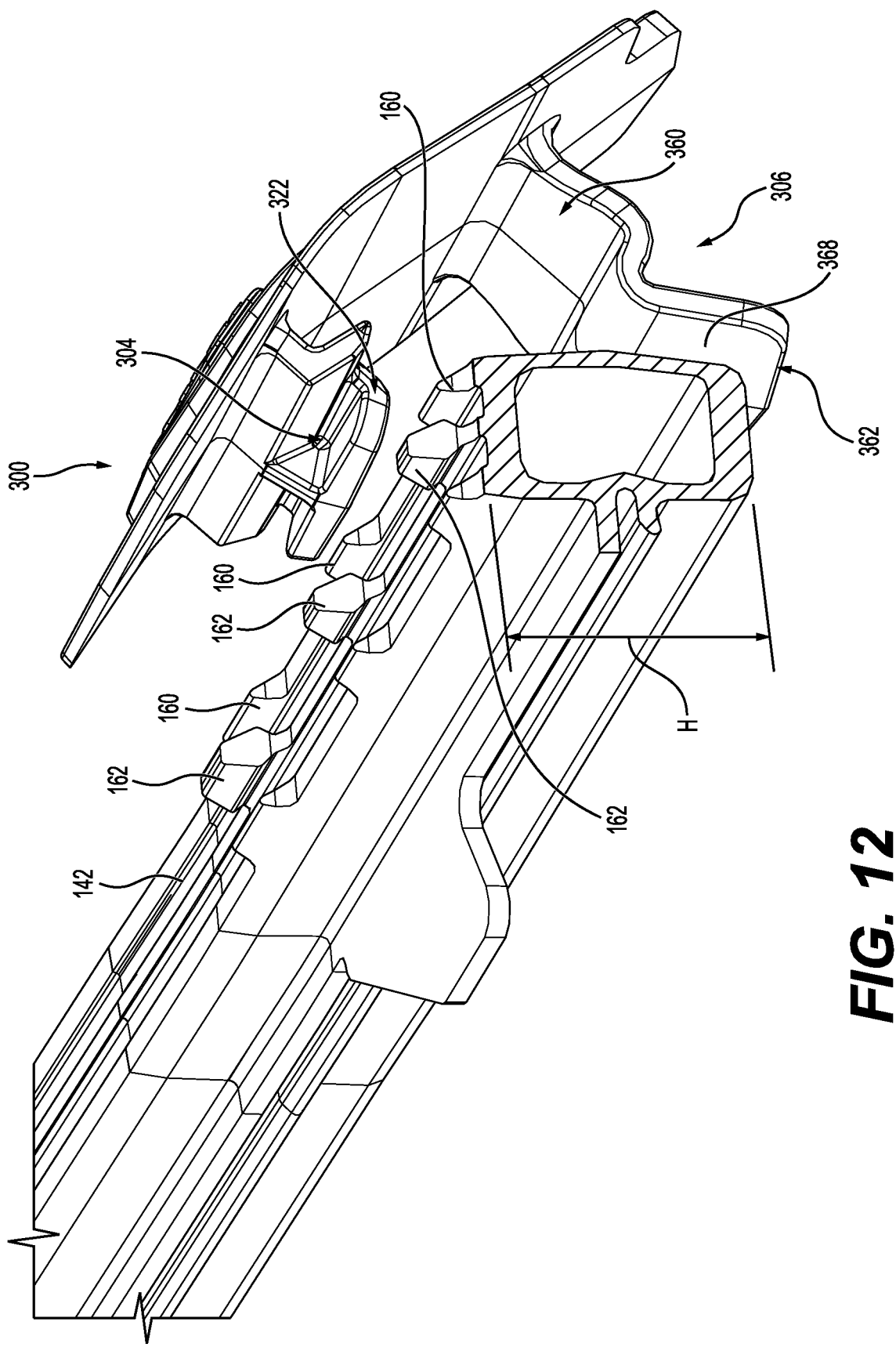
FIG. 12 is a perspective view of the clip and the edge portion of FIG. 11 as the clip is rotated into position to be engaged with the edge portion.

Next, as shown in FIG. 12, the clips 300 are engaged with the edge portions 142 of the left and right footrests 140. The engagement of the clips 300 will be described with reference to the right clip 300 illustrated in FIGS. 11 to 13. It is understood that the same process applies to the left clip 300.

To securely engage the clip 300 with the edge portion 142 of the footrest 140, the upper connector 304 is first engaged with the upper side of the edge portion 142. In order to do this, as shown in FIG. 12, the clip 300 is positioned so that the upper portion of the clip 300 is rotated inwardly toward the edge portion 142 while the lower portion of the clip 300 is rotated outwardly away from the edge portion 142. This places the lower connector 306 in a position that is out of the way from the edge portion 142 and thus allows positioning the interlocking feature 322 of the upper connector 304 over the projections 160, 162.

Still in the angled position of the clip 300, the first portion 324 of the interlocking feature 322 is placed between laterally-adjacent ones of the middle projections 160 so that a bottom end 329 of the first portion 324 is in place between the laterally-adjacent ones of the middle projections 160. Due to the angled disposition of the first and second portions 324, 326 which forms the V-shaped cross-sectional profile of the interlocking feature 322, in the angled position of the clip 300, the upper part of the first portion 324 does not interfere with the edge portion 142.

The clip 300 is then rotated in the opposite direction from that in which it was originally rotated. In other words, the clip 300 is rotated so that the lower portion of the clip 300 is rotated inwardly toward the edge portion 142 of the footrest 140. As the clip 300 is rotated inwardly, the lower connector 306 engages the lower part of the edge portion 142. More specifically, the angled upper surface 368 of the lip portion 362 contacts the lower part of the edge portion 142 and causes the lower connector 306 to flex relative to the clip body 302. In particular, as the user applies an increasing force on the clip 300 to overcome the resistance posed by the edge portion 142, due to the flexibility of the material from which the lower connector 306 is made, the lower connector 306 flexes relative to the clip body 302 so as to widen a gap between the upper and lower connectors 304, 306. Notably, as shown in FIG. 9, in an unbiased state of the lower connector 306, the gap between the upper and lower connectors 304, 306 has a dimension G measured vertically between the uppermost point of the curved upper surface 367 of the lip portion 362 and the bottom end 329 of the upper connector 304. However, as seen in FIG. 13, the dimension G is smaller than a height H (FIG. 12) of the edge portion 142 of the footrest 140 and therefore the flexion of the lower connector 306 relative to the clip body 302 helps receive the edge portion 142 of the footrest 140 between the upper and lower connectors 304, 306.

The lower part of the edge portion 142 thus slides on the angled upper surface 368 of the lip portion 362 as the clip 300 is pushed further against the edge portion 142. Once the edge portion 142 is past the curved upper surface 367 (i.e., past the lip portion 362), the lower connector 306 flexes back in place into its original unbiased state (i.e., the gap between the upper and lower connectors 304, 306 acquires the dimension G) and is received in the seat portion 360 where it is securely held between the inner surface 309 of the clip body 302 and the lateral side wall 366, as shown in FIG. 13. Notably, once the lower part of the edge portion 142 is received in the seat portion 360, the edge portion 142 is prevented from being dislodged accidentally from between the upper and lower connectors 304, 306.

At the same time as the clip 300 is being rotated to force the lower part of the edge portion 142 in position in the seat portion 360, the interlocking feature 322 gets into its final "engaged" position on the upper side of the edge portion 142, illustrated in FIG. 13. In particular, the first portion 324 is rotated so that it is upright between the longitudinally-adjacent ones of the middle projections 162 while the second portion 326 is rotated downwardly to be engaged between the outer projections 160 and the middle projections 162. As such, the upper connector 304 is engaged with the upper side of the edge portion 142 of the footrest 140 to restrict forward and rearward longitudinal movement of the clip 300 relative to the footrest 140. Notably, as described above, the first portion 324 of the upper connector 304 is interlocked with the middle projections 162 of the edge portion 142 and thereby restricts forward and rearward longitudinal movement of the clip 300 relative to the footrest 140. Simultaneously, the second portion 326 of the upper connector 304 restricts lateral movement of the clip 300 relative to the footrest 140.

As will be understood by the reader, the process of engaging the clips 300 with the footrests 140 is simple and can thus be undertaken by single-handed operation. That is, the user can engage each clip 300 with the corresponding footrest 140 with one hand.

Once the clips 300 are in place, the adjustable straps 380 are then tightened so as to increase longitudinal tension in the cover body 202. More specifically, as the adjustable straps 380 are tightened, the upper connectors 304 of each of the clips 300 are engaged with the front one of the longitudinally-adjacent ones of the middle projections 160 between which the first portion 324 is positioned and longitudinal tension in the cover body 202 is thereby increased. This is helpful to ensure that the cover body 202 is taut against the snowmobile 100 to prevent the cover 200 from being blown off the snowmobile 100 while being transported. Moreover, as longitudinal tension is increased in the cover body 202, the cover 200 cannot be removed simply by pulling rearwards on the cover 200 as the front end of the cover body 202 will also be applying a tension on parts of the snowmobile 100.

In order to remove the cover 200 from the snowmobile 100, the adjustable straps 380 are loosened to release the longitudinal tension in the cover body 202. The clips 300 must then be disengaged from the respective edge portions 142 of the left and right footrests 140. Each clip 300 is disengaged from the respective edge portion 142 by pulling downward on the lip portion 362 of the lower connector 306. By continuously pulling downward on the lip portion 362, the lower part of the edge portion 142 is dislodged from the seat portion 360 of the lower connector 306. The lower connector 306 is further rotated outwardly to completely disengage the edge portion 142. This same rotational movement of the clip 300 will have dislodged the second portion 326 from between the outer and middle projections 160, 162 of the edge portion 142. The clip 300 is then lifted off the upper side of the edge portion 142. The cover 200 can then be entirely removed from the snowmobile 100.

Figure 15:
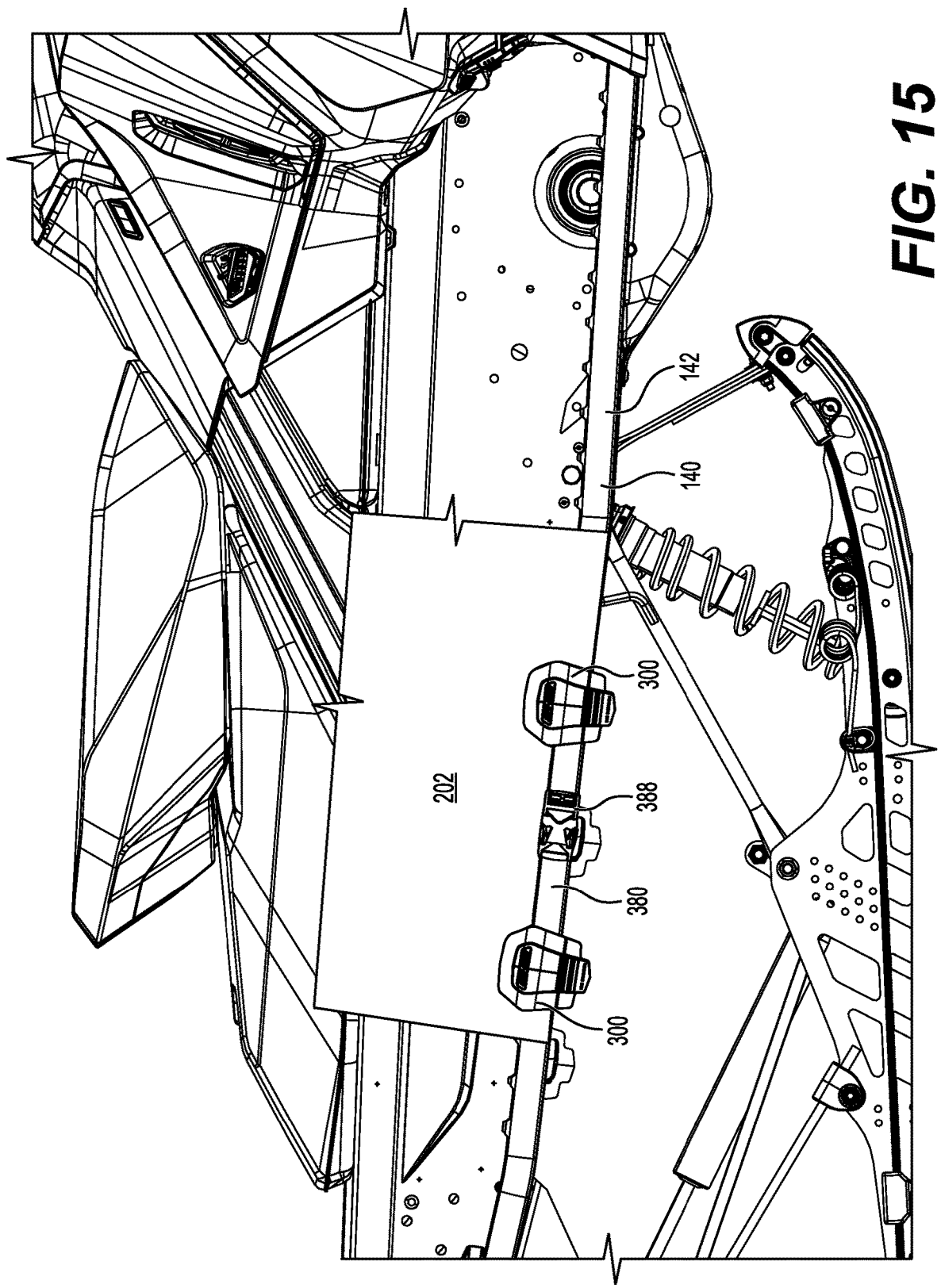
FIG. 15 is a right side elevation view of part of the snowmobile in accordance with another embodiment.
Figure 16:
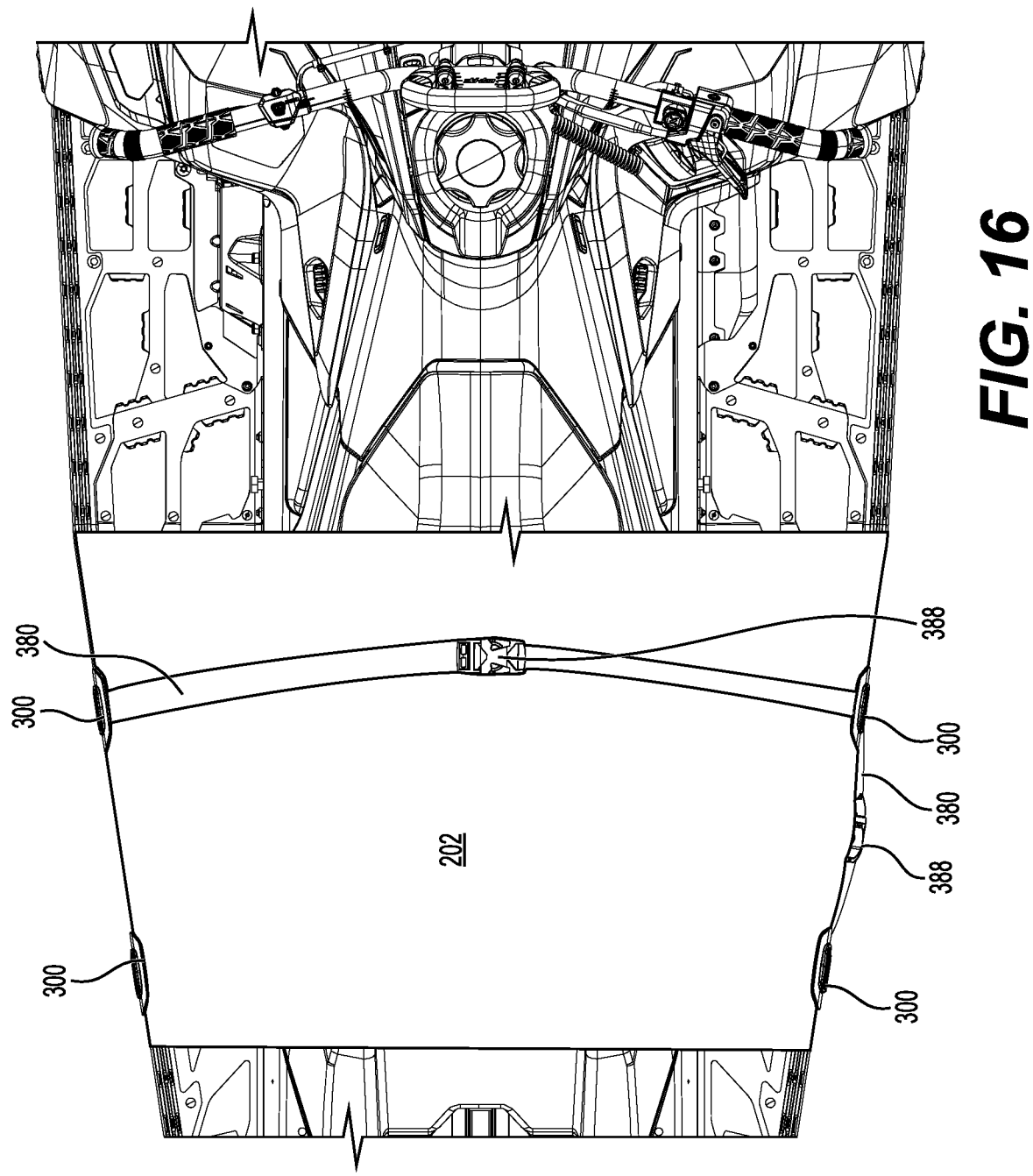
FIG. 16 is a top plan view of part of the snowmobile in accordance with another embodiment.

With reference to FIG. 15, in an alternative embodiment, the cover 200 includes two clips 300 on each lateral side of the cover body 202 (the cover body 202 being only partially shown in FIG. 15 for clarity). That is, two clips 300 are provided on the left lateral side and two clips 300 are provided on the right lateral side of the cover body 202. The adjustable strap 380 is connected between the two clips 300 on each lateral side so as to tighten the cover body 202 over the snowmobile 100 by adjusting the distance between the two clips 300 on each lateral side. In some embodiments, as shown in FIG. 16, the adjustable strap 380 may be provided on a single lateral side of the cover body 202, connected between the two clips 300 on that lateral side. Moreover, as can be seen in FIG. 16, an additional adjustable strap 380 is connected between the front right lateral clip 300 and the front left lateral clip 300, with the buckle 388 allowing the tightening of the cover body 202 in the lateral direction thereof (i.e., increasing the lateral tension in the cover body 202). In other embodiments, the additional adjustable strap 380 could extend in the same direction but instead be connected between the front left or front right lateral clip 300 and the cover body 202. In yet other embodiments, the additional adjustable strap 380 could extend in the same direction but instead be connected between two laterally spaced locations of the cover body 202.

Alternatively, two adjustable straps 380 could be provided, one being connected between the rearmost left lateral clip 300 and the rearmost right lateral clip 300 and another one being connected between the frontmost left lateral clip 300 and the frontmost right lateral clip 300. As such, the two adjustable straps 380 would extend laterally between two of the clips 300 (as shown for one set of opposite lateral clips 300 in FIG. 16). In other embodiments, the two adjustable straps 380 could instead each be connected between two laterally spaced locations of the cover body 202, or between one of the front or rear clips 300 and a location of the cover body 202 laterally inward of that clip 300.

In some embodiments, two clips 300 could be provided on one lateral side of the cover body 202 while a single clip 300 is provided on the opposite lateral side of the cover body 202.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A cover for covering at least partially a vehicle, the vehicle comprising a straddle seat and a footrest extending along a lateral side of the vehicle, the cover comprising:
   a cover body; and
   a clip connected to the cover body and configured to be connected to the footrest of the vehicle, the clip comprising:
   a clip body having an inner side and an outer side opposite the inner side, the clip body being fastened to the cover body;
   an upper connector extending from the inner side of the clip body, the upper connector being configured to engage an upper side of the footrest so as to restrict forward movement of the clip relative to the footrest; and
   a lower connector extending from the inner side of the clip body, the lower connector being configured to engage a lower side of the footrest,
   the clip being configured such that, when the clip is connected to the footrest, an edge portion of the footrest is located between the upper and lower connectors.

2. The cover of claim 1, wherein the upper connector comprises an interlocking feature for locking onto part of the edge portion of the footrest to restrict forward movement of the clip relative to the footrest.

3. The cover of claim 2, wherein:
   the edge portion of the footrest comprises a plurality of projections projecting upwardly on the upper side of the footrest; and
   the interlocking feature comprises a first portion configured to fit between adjacent ones of the projections so as to restrict forward movement of the clip relative to the footrest.

4. The cover of claim 3, wherein:
   the plurality of projections is a plurality of first projections forming a first row;
   the edge portion of the footrest further comprises a plurality of second projections projecting upwardly on the upper side of the footrest, the second projections being aligned with one another to form a second row adjacent and parallel to the first row; and
   the interlocking feature further comprises a second portion configured to fit between one of the first projections and one of the second projections adjacent to the one of the first projections.

5. The cover of claim 4, wherein the first portion of the interlocking feature is centered relative to the second portion of the interlocking feature along a direction generally parallel to the inner side of the clip body.

6. The cover of claim 4, wherein:
   the interlocking feature has a generally V-shaped cross-sectional profile;
   the first portion of the interlocking feature forms a first side of the V-shaped cross-sectional profile; and
   the second portion of the interlocking feature forms a second side of the V-shaped cross-sectional profile.

7. The cover of claim 4, wherein the clip further comprises at least one rib interconnecting the first and second portions of the interlocking feature.

8. The cover of claim 4, wherein:
   a cross-section of the second portion along a direction generally parallel to the inner side of the clip body is generally trapezoidal; and
   a lengthwise dimension of the trapezoidal cross-section of the second portion is greater at a bottom of the cross-section than at a top of the cross-section.

9. The cover of claim 3, wherein:
   a cross-section of the first portion of the interlocking feature along a direction generally parallel to the inner side of the clip body is generally trapezoidal; and
   a lengthwise dimension of the trapezoidal cross-section of the first portion is greater at a top of the cross-section than at a bottom of the cross-section.

10. The cover of claim 1, wherein the lower connector comprises a seat portion configured to receive a lower part of the edge portion of the footrest when the clip is connected to the footrest.

11. The cover of claim 10, wherein:
   the lower connector comprises a lip portion including an angled surface extending inwardly and downwardly, the seat portion being closer to the clip body than the lip portion;
   when the clip is being engaged to the footrest, the angled surface is configured to contact the edge portion of the footrest and cause the lower connector to flex relative to the clip body so as to widen a gap between the upper and lower connectors; and
   the lower connector is configured to flex back in place when the edge portion of the footrest is past the lip portion and is received in the seat portion.

12. The cover of claim 11, wherein the angled surface of the lip portion extends vertically higher than the seat portion.

13. The cover of claim 1, wherein the clip body is sewn to the cover body.

14. The cover of claim 13, wherein:
the clip body has a central portion and a peripheral portion at least partially surrounding the central portion;
the peripheral portion is thinner than the central portion; and
at least part of the peripheral portion of the clip body is sewn to the cover body.

15. The cover of claim 1, further comprising an adjustable strap connected between the clip and the cover body, the adjustable strap being configured to adjust a tension in the cover body by selectively adjusting a length of the adjustable strap.

16. The cover of claim 1, wherein the clip is disposed at an edge of the cover body.

17. The cover of claim 1, wherein the cover is configured to cover at least partially a snowmobile.

18. The cover of claim 1, wherein the cover body is made of water repellent polyester.

19. The cover of claim 1, wherein:
the clip is a first clip;
the footrest is a first footrest and the lateral side of the vehicle is a first lateral side of the vehicle;
the vehicle comprises a second footrest extending along a second lateral side of the vehicle;
the cover further comprises a second clip connected to the cover body and configured to be connected to the second footrest of the vehicle, the second clip comprising:
a clip body having an inner side and an outer side opposite the inner side, the clip body of the second clip being fastened to the cover body;
an upper connector extending from the inner side of the clip body of the second clip, the upper connector of the second clip being configured to engage an upper side of the second footrest so as to restrict forward movement of the second clip relative to the second footrest; and
a lower connector extending from the inner side of the clip body of the second clip, the lower connector of the second clip being configured to engage a lower side of the second footrest,
the second clip being configured such that, when the second clip is connected to the second footrest, an edge portion of the second footrest is located between the upper and lower connectors of the second clip.

20. A cover for covering at least partially a vehicle, the vehicle comprising a seat and a footrest extending along a lateral side of the vehicle, the footrest including at least one projection, the cover comprising:
a cover body configured to cover a portion of the vehicle;
a clip connected to the cover body and configured to be connected to the footrest of the vehicle, the clip comprising:
a clip body having an inner side and an outer side opposite the inner side, the clip body being fastened to the cover body; and
a connector extending from the inner side of the clip body, the connector being configured to engage the at least one projection of the footrest so as to restrict forward movement of the clip relative to the footrest; and
an adjustable strap having a first end and a second end, the first end being connected to one of the clip and the cover body, the second end being connected to the cover body, whereby tightening the adjustable strap pulls the first end towards the second end to cause the connector to engage the at least one projection and increase longitudinal tension in the cover body.

* * * * *